Dec. 6, 1960   L. A. CARLSON   2,963,058
DRILL AND DRILL HEAD
Filed Feb. 19, 1957
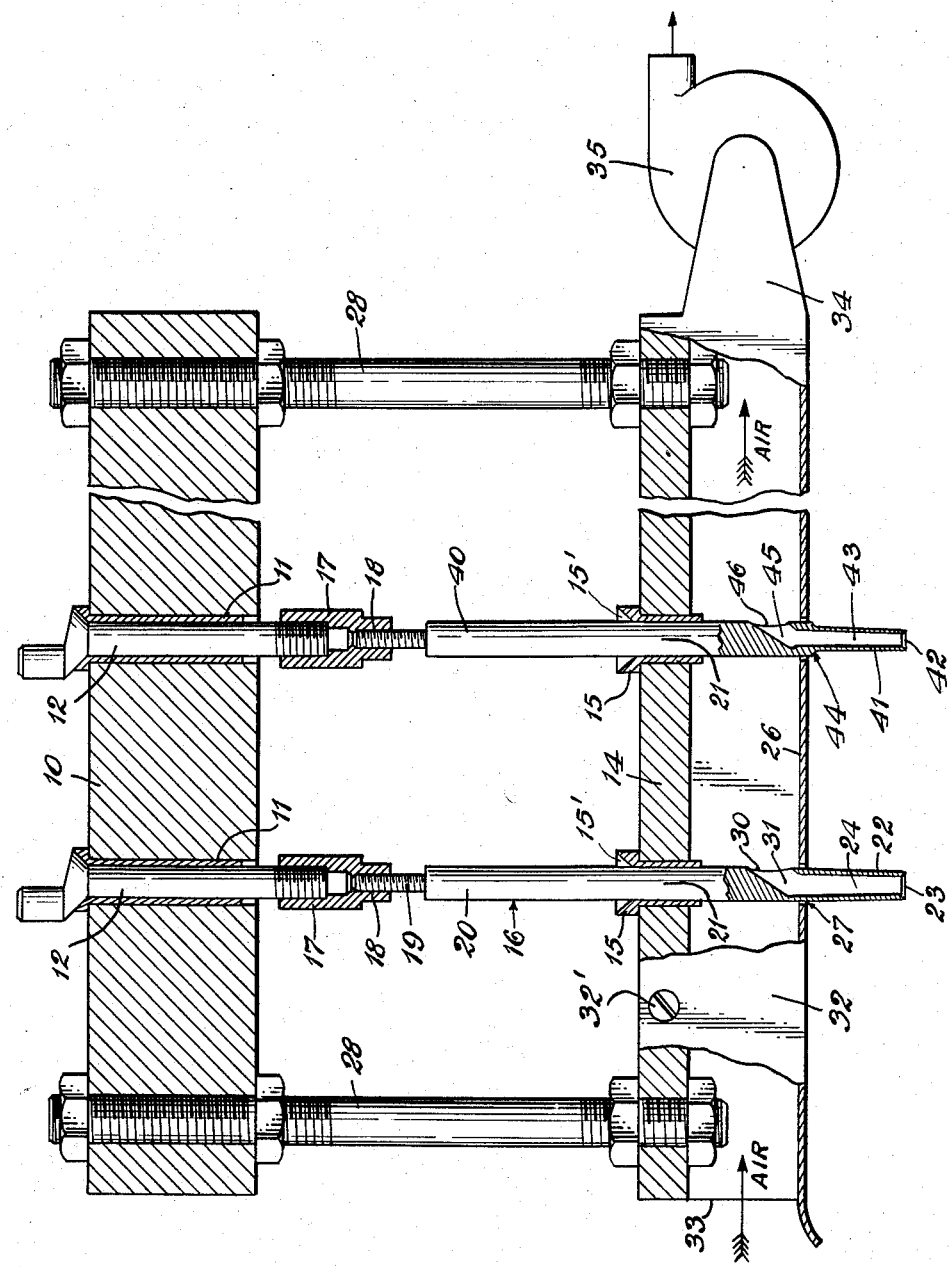
INVENTOR.
Lorien A. Carlson
BY
W. Bartlett Jones,
Attorney

United States Patent Office 2,963,058
Patented Dec. 6, 1960

2,963,058

DRILL AND DRILL HEAD

Lorien A. Carlson, Cloquet, Minn., assignor to Wood Conversion Company, St. Paul, Minn., a corporation of Delaware Filed Feb. 19, 1957, Ser. No. 641,132

14 Claims. (Cl. 144—110)

The present invention relates generally to apparatus for drilling one or more holes in articles such as fiberboard, and, in particular, to a drill head and a special drill therefor for forming holes in articles such as acoustic tile.

Twist drills have certain disadvantages in drilling fiberboard of the kind commonly used for acoustic tile. Hollow core drills have been found more suitable. Acoustic tile material is porous and in principle sound waves enter the holes bored in the tile and from the holes enter the pores within the tile wherein they are absorbed. Twist drills, although they cut fiber in forming holes, leave many fibers uncut at the wall of the hole, but turned laterally and worked into the wall of the hole as a sort of lining, thus clogging passageways from the drilled hole into the material of the tile. The resulting tile are less efficient acoustically. Hollow core drills, such as illustrated in the present invention, cut the fibers at the wall of the hole as the drill progresses into the tile. The cut material forms a core within the drill structure which is designed to permit easy discharge of the cut core, fibers and dust.

The present invention has for its object to provide a hollow core drill and a drill head, especially one for a multiplicity of such drills, both coordinated to minimize wear in the drill head which is an expensive mechanism; to provide for a thrust-taking bushing for each drill thereby to relieve the drill head from taking such thrust; to facilitate lubrication of such bushings thereby to prolong life of the bushing and the drill; to prevent dripping of lubricant onto the work being drilled; and to facilitate removal of core material without contaminating drill bearings.

Various other and ancillary objects and advantages of the invention will become apparent from the following description and explanation of the invention as shown in the accompanying drawing.

The drawing is a fragmentary view partly in cross-section of a portion of the general assembly of a drilling head with two sizes of drill mounted therein.

Although the invention is illustrated in its preferred embodiment for multiple drilling, it is to be understood that the invention may be carried out in apparatus for a single drill.

In the drawing, the numeral 10 indicates a stationary plate as a part of a drill head, which head and plate are movable toward and away from the workpiece, such movement being herein illustrated as vertical for future reference to the drawings.

The plate 10 contains a multiplicity of bronze bearings 11 of which only two are illustrated, in each of which bears a spindle 12 vertically fixed therein. The numerous spindles 12 are preferably all rotated at the same drilling speed by means not shown but well known in the art.

Spaced well below the plate 10 and mounted to move vertically with it, is a bushing plate 14 with a multiplicity of bushings 15 alined with the spindles 12. For the bushings 15, there are drills of the present invention generally designated 16. Each drill is secured to a spindle 12 by a threaded coupling 17 which at one end threads tightly onto spindle 12, and which at the other end presents a threaded socket 18 for a threaded stem 19 on the upper end of drill 16. The direction of rotating the spindles 12 keeps the drills tightly threaded to the spindles. Below the threaded stem 19, the drill has a long cylindrical shank 20, a lower region 21 of which is a cylindrical bearing portion which runs in the bushing 15. From the bearing portion 21 the drill is longer toward the mounted end than toward the cutting end.

The lower end 22 of the drill 16 is tapered to a cutting edge 23, and within the tapered end is an inwardly flaring hollow core 24 of circular cross-section, the outside taper being designed for clearance in withdrawing the drill from the hole formed by it, and the flare being designed for facilitating the movement of the cut-core or slug upwardly inside the drill. As an example, the change in outside diameter of the tapered portion 22 of the drill 16 may be of the order of 0.03 inch per inch. The tapered wall of the drill may begin at the lowest diameter of the cylindrical shank portion 20, or it may start elsewhere, as later explained herein. The tapered wall of the drill may vary in thickness as shown in drill 16 or be uniform as indicated later.

Close to, but not necessarily at, the lower end of the cylindrical shank portion 20 is a baffle plate 26 with a non-bearing circular hole 27 therein alined with a bushing 15 for free rotation of the drill passing through said hole. The plates 10 and 14 are rigidly connected as a unit by tie bolts 28. Baffle plate 26 is carried as a part of said unit as later described.

The drill structure is related to the plates 14 and 26. Between the bushing plate 14 and the baffle plate 26 and in the cylindrical portion of the drill shank 20 is a port 30 of a passageway 31 communicating with the hollow core 24 and having a formation to permit easy discharge of cut-cores or slugs from the hole drilled. All the cross-sectional areas of the passageway 31 from the port 30 to the top of the hollow core 24 are at least such as to comprehend the largest cross-section of the hollow core 24. This may be effected mechanically by drilling a hole laterally into and downwardly of the shank 20 from its side wall toward the hollow core 24. A ball-end drill of diameter suitably larger than the top of the hollow core 24 is preferred forming the passageway 31 within the drill and the port 30.

The space between the baffle plate 26 and the bushing plate 14 provides a clean-out chamber having side plates designated 32 secured to plate 14 by stove bolts 32'. The chamber has an entrance 33 for air at one side and on the opposite side an exit 34 for air, which exit is connected to a suction fan 35. Thus, a mild current of air sweeps through the chamber and removes fibers, dust and slugs discharged from the drills. As slugs are formed in the drill, they are pushed to the port 30 and the current of air carries them away, thus keeping fibers and dust away from the ends of bushings 15. The tops of bushings 15 have oil wells 15' to catch drippings of lubricant running down the drill, and the slight suction tends to draw this oil downward and to flush the bushing.

The drill structure is not limited to that shown for drill 16. The adjacent drill is a modified form, suitable for drilling smaller holes than the drill 16. In order that the same head may be used for the two illustrated drills, all have the same sized shank with the working end variable in diameter.

The modified drill has its shank designated 40, being the same as shank 20. The tapered end 41 has a wall of uniform thickness terminating at a cutting edge 42 with an upwardly flaring hollow core 43. The tapered portion 41 is connected by a shoulder 44 to the shank portion 40. The hollow core 43 is shown flaring upwardly beyond the shoulder 44 to connect with passageway 45 and its exit port 46 in the shank wall.

In drilling heads of the type described, the ends of some drills heretofore have been mounted in powered spindles to project therefrom directly to the work without intermediate support. Because there is a certain degree of whipping of the drill, the drill has heretofore been made short to minimize the whipping. It has been found that such whipping of unsupported drills carries all the lateral thrust into the drill head and accelerates the rate of wear and the need of repair or replacement. By means of the present invention, the drill is elongated by providing it with a relatively long straight solid shank portion which shank is supported well beyond its mounted end by the bushing 15 in the bushing plate 14, and beyond such bearing region is open on the interior to discharge slugs from the remaining cylindrical shank portion. Thus, all the side thrust on the drill is imparted to the bushing 15, and the wear thus allowed to accumulate in those bushings rather than in the spindles 12 and bushings 11 thereof. Bushings 15 are of low cost and easily replaced.

Other advantages accrue. Drippings of lubricant from the spindle bearings 11 serve to lubricate the bushings 15, the latter being an obstacle to prevent lubricant from the spindles striking the workpiece. By the provision of a solid portion of the cylindrical shank 20 or 40 beyond the bushing 15 and by the provision of the suction space between plates 14 and 26, the current of air and the moving waste give additional protection to the workpiece from damage by lubricant dripping from the bushings 15.

From the foregoing, it is to be understood that the drill is new and that the drill and the drilling head are cooperative as an assembly to offer various advantages in the drilling of acoustic tile. Both are subject to modification within the spirit and scope of the appended claims.

I claim:

1. In combination, a drill having an elongated shank portion and having a relatively long nearly cylindrical conically tapered end portion terminating on its exterior wall in a cutting edge, said end portion having an inwardly tapering wall in part forming said cutting edge, said end inwardly from said last-mentioned wall being hollow with an inwardly flaring opening, the shank portion adjacent the tapered end having a passageway therein of which all cross-sectional areas comprehend the largest diameter of the flaring hollow opening, which passageway extends from the wall of the shank portion at an angle to intersect the hollow opening, whereby said passageway provides an exit port in the shank of the drill for the discharge of material cut away by the drill, two spaced means through which the shank portion extends, one being on one side of said port and the other being on the other side of said port, the space between said two means having an opening at one side for admitting air to said space, and suction means connected to said space at the opposite side to cause a current of air to move past the drill in the space between said spaced means, whereby to carry away waste cut by the drill.

2. Apparatus according to claim 1 in which the drill passes through a bushing in one of said spaced means.

3. Apparatus according to claim 2 in which the bushing is in the one of said two spaced means which is remote from the cutting edge and in which the remaining one of said two spaced means provides non-bearing clearance for the drill.

4. A drilling assembly comprising drill-mounting means, a powered spindle in said means, a drill connected to said spindle for rotation therewith, said drill having an elongated shank portion, a bushing plate spaced below said means and intermediate the two ends of the shank portions of the drill, a bushing in said bushing plate in which bears a cylindrical portion of said shank, a second plate spaced below said bushing plate with a hole through which said shank portion of said drill passes with non-bearing clearance, the shank portion below said bushing being shorter than the shank portion above said bushing and the shank portion having a cross-section permitting its insertion upwardly through said bushing for connection to said spindle, said drill below said second plate having a vertically long nearly cylindrical conically tapered end portion with its wall terminating in a cutting edge at the drill-end, said cutting edge being formed also by a relatively short inwardly tapering wall, said end beyond said last-mentioned wall being hollow with an upwardly flaring opening, the shank portion in the space between the bushing plate and the second plate having a passageway therein all cross-sectional areas of which comprehend the largest diameter of the flaring hollow opening, which passageway extends from the shank wall at an angle to intersect the hollow opening, whereby said passageway provides an exit port in the shank of the drill for the discharge of material cut away by the drill, and means to provide a current of air moving across the drill through the space between the bushing plate and the second plate whereby to carry away waste discharged through said port.

5. Apparatus according to claim 4 in which suction means provides said current of air.

6. A drilling assembly comprising a head plate having a plurality of spindle bearings therein, powered spindles in said bearings, drills connected to said spindles for rotation therewith, each drill having an elongated shank portion, a bushing plate spaced below said head plate and intermediate the two ends of the shank portions of the drills beyond said spindles, bushings in said bushing plate in which bear cylindrical portions of the shanks of said drills, a third plate spaced below said bushing plate with holes through which said shank portions of said drills pass with non-bearing clearance, the shank portions of said drills below said bushings being shorter than the shank portions above said bushings, and the shank portions having cross-sections permitting their insertion upwardly through said bushings for connection to said spindles, said drills below said third plate being tapered to a cutting edge at the drill-end and being hollow with an upwardly flaring opening, the shank portion in the space between the bushing plate and the third plate having a passageway therein all cross-sectional areas of which comprehend the largest diameter of the flaring hollow opening, which passageway extends from the shank wall at an angle to intersect the hollow opening, whereby said passageway provides an exit port in the shank of the drill for the discharge of material cut away by the drill, and means to provide a current of air moving across the drills through the space between the bushing plate and the third plate whereby to carry away waste discharged through said ports.

7. Apparatus according to claim 6 in which suction means provides said current of air.

8. In combination a rotary spindle, a head in which said spindle bears, an elongated drill adapted for connection to the spindle for rotating the drill, a bearing for the drill fixed with reference to said head and located to bear the drill intermediate its ends, said drill being hollow from its cutting end and having an exit port in an exposed portion of its side wall which port terminates the hollow thereof, means forming a chamber containing said port and for an air current through which means projects the free end of said drill, said chamber-forming means containing said bearing, and means to cause a current of air to move through said chamber past said drill for carrying away material discharged from said port, said drill having a cross-section permitting the mountable end of the drill to pass through said means and said bearing for connection to said spindle.

9. An integral drill having an elongated shank portion and having a relatively long nearly cylindrical tapered end portion terminating on its exterior wall in a cutting edge, said end portion having an inwardly tapering wall in part forming said cutting edge, said end inwardly from said last-mentioned wall being hollow with an inwardly flaring opening, the shank portion having a passageway therein of which all cross-sectional areas comprehend the largest diameter of the flaring hollow opening, which passageway extends angularly from the wall of the shank portion toward said end portion to intersect the hollow opening, whereby said passageway provides an exit port in the shank of the drill for the discharge of material cut away by the drill, said shank portion extending beyond said port and there having a cylindrical bearing portion on its wall for rotation in a supporting bushing, said bearing portion being located intermediate the two ends of the shank portion, every portion of the shank beyond said bearing portion from said end portion having a cross-section not greater than the cross-section of said bearing portion, the portion of the shank on the port side of the bearing portion being shorter than the portion of the shank on the other side of the bearing portion.

10. An integral drill having an elongated shank portion and having a relatively long nearly cylindrical conically tapered end portion terminating on its exterior wall in a cutting edge, said end portion having an inwardly tapering frusto-conical wall in part forming said cutting edge, said drill inwardly from said wall being circularly hollow with cross-sectional areas having in the inward direction diameters at least as large as the diameters in the outward direction, the shank portion having a passageway therein of which all cross-sectional areas comprehend the largest cross-section of the hollow of the drill, which passageway extends angularly from the wall of the shank portion toward said end portion to intersect the hollow of the drill, whereby said passageway provides an exit port in the shank of the drill for the discharge of material cut away by the drill, said shank portion extending beyond said port and there having a cylindrical bearing portion on its wall for rotation in a supporting bushing, said bearing portion being located intermediate the two ends of the shank portion, every portion of the drill beyond said bearing portion from said end portion having a cross-section not greater than the cross-section of said bearing portion, and the portion of the shank on the port side of the bearing portion being shorter than the portion of the drill on the other side of the bearing portion.

11. Apparatus having in combination an integral drill mounted for axial rotation, mounting and driving means for one end of said drill, said drill being hollow from its working end and having a discharge port in the shank connecting with the hollow interior for discharging drilling waste, two spaced walls forming a chamber for a stream of air carrying waste away from said port, said drill passing through said chamber and being mounted to said driving means outside said chamber, said two spaced walls having alined openings for the drill, and the entire drill having a cross-section not greater than the cross-section of each of said alined openings, thereby permitting passage of the drill endwise through said openings toward said mounting and driving means for driving connection therewith.

12. Apparatus according to claim 11 in which the drill bears in at least one of said walls.

13. Apparatus according to claim 11 in which the drill bears in the wall remote from the working end and runs free in the other wall.

14. Apparatus having in combination an integral drill mounted for axial rotation, mounting and driving means for one end of said drill, said drill being hollow from its working end and having a discharge port in the shank connecting with the hollow interior for discharging drilling waste, two spaced walls forming a chamber for a stream of air carrying waste away from said port, said drill passing through said chamber and being mounted to said driving means outside said chamber, said two spaced walls having alined openings for the drill, and the entire drill having a cross-section not greater than the cross-section of each of said alined openings, thereby permitting passage of the drill endwise through said openings toward said mounting and driving means for driving connection therewith, said port opening into said chamber when said drill is so mounted, the chamber wall which lies beyond said port toward the mounting means having a bushing therein providing one said alined holes, the drill having a cylindrical bearing portion located to run in said bushing, and the portion of the drill beyond said bearing portion toward said mounted end being longer than the portion of the drill on the other side of said bearing portion.

References Cited in the file of this patent

UNITED STATES PATENTS

| | | |
|---|---|---|
| 457,606 | Norcross | Aug. 11, 1891 |
| 473,153 | Harris | Apr. 19, 1892 |
| 475,560 | Heydenreich | May 24, 1892 |
| 502,120 | Hicks | July 25, 1893 |
| 513,088 | Crane | Jan. 23, 1894 |
| 974,293 | Pignone | Nov. 1, 1910 |
| 1,195,392 | Nielsen | Aug. 22, 1916 |
| 1,633,752 | Rackstraw | June 28, 1927 |
| 2,167,279 | Manny | July 25, 1939 |
| 2,187,651 | Jackson | Jan. 16, 1940 |
| 2,234,789 | Wunderlich | Mar. 11, 1941 |
| 2,323,694 | Ward et al. | July 6, 1943 |
| 2,606,615 | Pevey et al. | Aug. 12, 1952 |
| 2,615,525 | Berner | Oct. 28, 1952 |
| 2,637,396 | Spiller et al. | May 5, 1953 |
| 2,678,694 | Homann | May 18, 1954 |